United States Patent [19]
Arends

[11] Patent Number: 5,964,134
[45] Date of Patent: Oct. 12, 1999

[54] TRIM APPARATUS AND METHOD FOR TRIMMING AN ARTICLE FROM A THERMOPLASTIC SHEET

[76] Inventor: Albert W. Arends, 3017 N. South Dr., Gladwin, Mich. 48624

[21] Appl. No.: 08/872,986

[22] Filed: Jun. 11, 1997

[51] Int. Cl.[6] ....................................................... B26D 5/20
[52] U.S. Cl. .................................. 83/13; 83/662; 83/681; 83/368
[58] Field of Search .............................. 83/620, 627, 687, 83/691, 946, 699.31, 699.51, 455, 147, 409, 650, 342, 295, 135, 628, 41

[56] References Cited

U.S. PATENT DOCUMENTS

| | | | |
|---|---|---|---|
| 491,307 | 2/1893 | Gaylord | 83/455 |
| 754,085 | 3/1904 | Nairn | 83/691 |
| 2,855,627 | 10/1958 | Pretiss | 83/147 |
| 3,664,791 | 5/1972 | Brown | 425/156 |
| 3,733,773 | 5/1973 | Hamilton | 83/409 |
| 3,771,281 | 11/1973 | Witte | 83/650 |
| 3,771,396 | 11/1973 | Im | 83/691 |
| 3,794,228 | 2/1974 | Colwill et al. | 225/93 |
| 3,826,165 | 7/1974 | Currie et al. | 83/342 |
| 3,919,906 | 11/1975 | Law | 83/295 |
| 4,313,358 | 2/1982 | Brown | 83/97 |
| 4,391,171 | 7/1983 | Wendt | 83/135 |
| 4,462,291 | 7/1984 | Schultz | 83/627 |
| 4,535,689 | 8/1985 | Putkowski | 83/627 |
| 4,590,834 | 5/1986 | Sobel | 83/620 |
| 4,890,524 | 1/1990 | Brown et al. | 83/628 |
| 4,987,811 | 1/1991 | Ikaraski et al. | 83/687 |
| 5,225,213 | 7/1993 | Brown et al. | 425/292 |
| 5,249,492 | 10/1993 | Brown et al. | 83/147 |
| 5,795,535 | 8/1998 | Giovannone | 83/41 |

Primary Examiner—Rinaldi I. Rada
Assistant Examiner—Gyounghyun Bae
Attorney, Agent, or Firm—John J. Swartz

[57] ABSTRACT

Method and apparatus for trimming an article integrally differentially pressure formed in a sheet of thermoplastic material comprising a pair of trim dies which are relatively moveable between spaced apart positions for receiving a sheet carrying an article to be trimmed, closed positions, engaging opposite sides of the sheet, and then to sheet severing positions in which an article is severed from the sheet. The dies are relatively moved via a wedge which is transversely moveable on the machine and includes a first sharply inclined wedge surface for rapidly advancing the trim dies from the spaced apart positions to the closed positions. A second, less inclined wedge surface, which is a continuation of the first wedge surface, is provided for moving the trim dies from the closed positions to the sheet severing positions. Servomotor driven crank mechanism is provided for selectively transversely concurrently moving the wedges in opposite direction through selected lengths of travel to selectively move the trim platen to any selected one of a plurality of different strokes between the open positions and the closed positions.

22 Claims, 8 Drawing Sheets

TRIM APPARATUS AND METHOD FOR TRIMMING AN ARTICLE FROM A THERMOPLASTIC SHEET

BACKGROUND OF THE INVENTION

1. Field of the Invention

This invention relates to a differential pressure forming machine which differentially pressure forms articles in a sheet of thermoplastic material and more particularly to method and apparatus for trimming articles from a thermoplastic sheet utilizing trim dies which are moved by a wedge that is driven by a servomotor driven crank in a to-and-fro path of travel transverse to the path of travel of the trim dies.

2. Description of the Prior Art and Objects

Apparatus, such as that disclosed in U.S. Pat. No. 3,664,791 granted to G. W. Brown on May 23, 1972, which is incorporated herein by reference, has been provided heretofore for successively delivering a heated thermoplastic sheet to a heating station and then to a forming station at which molds engage the sheet to differentially pressure form an article in the sheet.

Apparatus such as that disclosed in U.S. Pat. No. 4,313,358, granted to Gaylord W. Brown on Feb. 2, 1982, which is incorporated herein by reference, has been provided heretofore for trimming articles, differentially pressure formed in a thermoplastic sheet, at a trimming station which is downstream of the forming station.

In this latter mentioned patent, the trim dies are actuated through toggle linkages and cams which move the trim dies to positions engaging opposite sides of the sheet and thence to sheet severing positions.

The trim dies provided in the prior art differential pressure forming machines are actuated by direct acting, pneumatically operated cylinders and/or cams for moving the trim mechanism to sever the differentially pressure formed article from the sheet.

Because of the rather substantial force required to move the trim dies between spaced apart, open positions, and closed positions, the prior art utilized double acting pneumatically operated cylinders which are quite large and relatively expensive. It has been found advantageous to utilize a wedge which is moveable transversely to the path of a movement of the trim dies for moving the trim dies from the open positions to the closed positions. Accordingly, it is an object of the present invention to provide a new and novel trim die machine including trim dies which are moveable in to-and-for longitudinal paths of travel and wedge mechanism, which is transversely moveable for wedging the trim dies between open positions and closed positions engaging opposite sides of the sheet.

U.S. Pat. No. 5,225,213 issued to G. W. Brown and Albert W. Arends on Jul. 6, 1993, discloses apparatus for trimming an article from a thermoplastic material including a wedge for incrementally moving the trim die from a closed position, in which the dies engage opposite sides of the sheet, to a further closed position in which the trim dies sever the sheet. This prior art wedge is also transversely moved via a pneumatically operated cylinder which is relatively expensive and inefficient. Accordingly, it is another object of the present invention to provide a new and novel trim machine including a transversely moveable wedge which is operated via a motor driven crank and which is more efficient than the pneumatically operated cylinders utilized heretofore.

The positioning of prior art pneumatically driven wedge is also relatively difficult to control and thus, the exact starting and stopping positions of the wedge, and the resultant distance which the molds move, is sometimes less accurate than desired. Accordingly, it is another object of the present invention to provide a new and novel trim machine of the type described which includes new and novel servomotor drive mechanism for more accurately controlling the starting and stopping positions of a wedge for moving the trim dies.

Another object of the present invention is to provide a trim machine of the type described which includes mechanism for electronically adjusting the stroke of the trim die by starting and stopping a servomotor which drives the trim die moving wedge in any selected one of a plurality of different positions.

It is sometimes desirable to move the trim platen a significant distance vertically at a rapid distance between the open positions and the closed, sheet engaging positions and the wedge disclosed in the aforementioned U.S. Pat. No. 5,225,213 did not provide structure for this to be accomplished. Accordingly, it is another object of the present invention to provide new and novel trim apparatus of the type described which includes new and novel wedge mechanism for moving the trim dies at varying rates of travel.

It has been found advantageous to not only utilize a wedge for moving the trim dies between the closed positions and the sheet severing positions but also to move the trim dies from the open positions to the closed positions. Accordingly, it is another object of the present invention to provide a new and novel trim machine including a new and novel motor driven wedge for moving the platen between the removed positions and closed positions.

It is a further object of the present invention to provide a new and novel trim machine of the type described which includes a first wedge section having a first inclination for relatively rapidly moving the trim dies between the open positions and the closed positions and a second wedge portion having a second lesser inclination for more slowly moving the trim dies between the closed positions and the sheet severing positions at a substantially lesser rate.

It is a still further object of the present invention to provide a new and novel trim machine of the type described having a first transversely moveable wedge portion for moving the trim dies from spaced apart positions to closed positions engaging opposite sides of the sheet and a second wedge for incrementally further moving the trim dies to sheet severing positions.

It is still a further object of the present invention to provide a trim machine of the type described including wedge mechanism for moving the trim dies between open, spaced apart positions to closed, sheet engaging positions at a first rate of travel and moving the trim dies from the closed positions to further closed, sheet severing positions at a lesser rate of travel.

The power required to relatively move the trim dies together is substantially greater when the trim dies are moving from the closed positions to the severing positions than when moving from the open positions to the closed positions. Accordingly, the degree of inclination of the wedge portion utilized to move the trim dies from the closed position to the sheet severing position must be substantially less than the degree of inclination of the wedge utilized to move the trim dies between the open positions and the closed positions when the trim dies are not operating in a cutting or severing mode. Accordingly, it has been discovered advantageous, according to the present invention, to provide a trim die moving wedge which incorporates a two step wedge having a first wedge section with a relatively sharp inclination for rapidly, relatively moving the non-loaded trim die and a section wedge section with a relatively lesser inclination for less rapidly relatively moving the die, while under load.

Accordingly, it is another object of the present invention to provide a trim machine of the type described which includes a two stage wedge having a first wedge portion with a sharp inclined cam surface for rapidly moving the trim die when the trim die is not under cutting load and a second wedge cam surface of substantially lesser inclination for moving the trim die while it is under cutting load.

Another object of the present invention is to provide a method for trimming an article from a thermoplastic sheet via new and novel wedge mechanism which more accurately controls the stroke of travel of the trim dies.

Another object of the present invention is to provide a method of trimming articles from a thermoplastic sheet of the type described including the step of converting rotary motion to linear motion via a crank which is swung in opposite directions of travel to any selected one of a plurality of degrees of travel to selectively control the stroke of the trim die to any selected one of a plurality of different trim strokes.

Other objects and advantages of the present invention will become apparent to those of ordinary skill in the art as the description thereof proceeds.

SUMMARY OF THE INVENTION

A trim machine for severing articles which have been differentially pressure formed in a thermoplastic sheet from the thermoplastic sheet comprising: a pair of opposed, cooperating trim dies mounted for movement between spaced apart positions spaced from the sheet, and first closed positions engaging opposite sides of the sheet, and second further closed, sheet severing positions to sever an article from the sheet at a trim station; mechanism for moving the trim dies between the spaced apart positions, the first closed positions and second further closed, sheet severing positions comprising a wedge mounted for movement in a second path of travel, transverse to the first path of travel, between a non-wedging mode, a first wedging mode, and a second wedging mode; the wedge including a first wedge section having a first inclination for moving at least one of the trim dies towards the other trim die at a predetermined rate of travel from the spaced apart position to the first closed position when the wedge is in the first wedging mode; the wedge including a second wedge section having a second inclination, for moving the one trim die towards the other trim die from the first closed position to the second closed position when the wedge is in the second wedging mode, and mechanism for successively transversely moving the wedge from the non-wedging mode to the first wedging mode and then to the second wedging mode comprising a crank rotatable about an axis and including an eccentric portion eccentrically coupled to the wedge, and a servomotor rotatable about the axis and driving a coupled to the crank.

DESCRIPTION OF THE DRAWINGS

The invention may be more readily understood by referring to the accompanying drawings, in which.

DESCRIPTION OF PREFERRED EMBODIMENT

Figure 1:
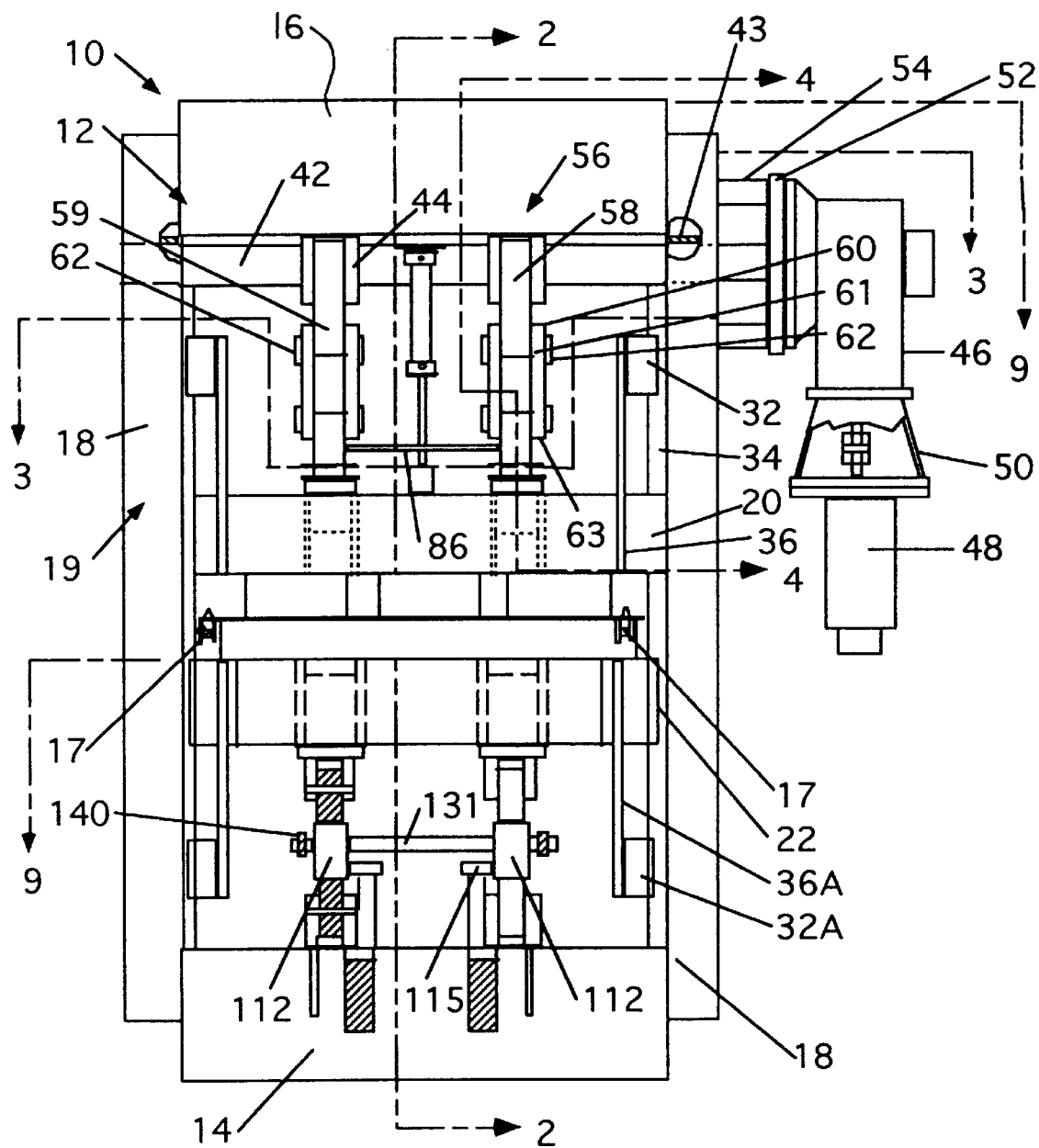
FIG. 1 is a front end elevational view of a trim machine constructed according to the present invention, illustrating the trim dies in closed positions engaging opposite sides of a sheet to be trimmed, part of the frame being broken away to better illustrate a bearing.

Apparatus constructed according to the present invention, generally designated 10, is provided for trimming an article A differentially pressure formed in a sheet 11 of thermoplastic material, such as polystyrene. The apparatus 10 includes a frame, generally designated 12, having a lower base 14 and an upper header 16 spanned by laterally spaced apart, vertical side rails 18. The article A may suitably comprise three dimensional, truncated cone shaped thin wall parts such as drinking cups, or plates which are stacked in nested relation after they have been severed from the sheet 11. The sheet 11 is carried by horizontal, laterally spaced apart chains 17 of conventional construction, driven by a conventional motor (not shown).

Mounted on the frame 12, for vertical relative movement toward and away from each other, is an upper trim die assembly 19 and a lower trim die assembly 21 having upper and lower platens, generally designated 20 and 22, respectively. The platens 20, 22 each include laterally spaced apart side frame members 24 spanned by longitudinally spaced apart rails 26. Intermediate cross rails 28 and 30 span the laterally spaced apart side frame members 24 and the longitudinally spaced apart rails 26 to reinforce the platen frame. The upper platen 20 is slidably mounted for vertical movement on the frame 12 via a pair of laterally spaced apart vertically disposed slides 32 which are C-shaped in section and guide on a pair of vertically disposed, laterally spaced apart slide bars 34 fixed to the inside surfaces of the vertical frame members 18. The pair of laterally spaced apart, vertically disposed slides 32 are fixed to the platen 20 via vertical posts 36 which are fixed to the upper platen frame members 24.

Vertical guides on slides 32A are mounted on the underside of the lower platen 22, via vertical posts 36A for sliding movement on the frame supported vertical guide rails 34. Platen moving apparatus, generally designated 40, is provided for vertically moving the upper trim die assembly 19 toward and away from the lower trim die assembly 21 and includes a horizontal drive shaft, generally designated 42, journaled in bearing blocks 44 provided on the underside of the upper header 16 and bearings 43 provided in vertical side rails 18. The shaft 42 is drivingly coupled to a gear box 46 which is driven via a motor 48 detachably coupled to the gear box 46 via a coupling 50. The gear box 46 is mounted on one of the vertical side rails 18 via a vertical mounting plate 52 spaced apart from the vertical side rail 18 via spacer blocks 54.

Figure 4:
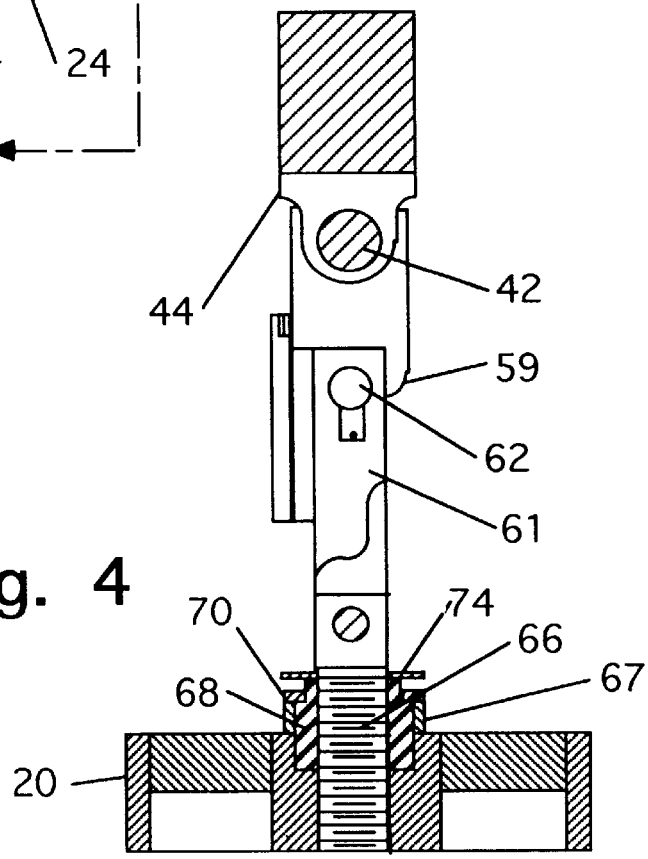
FIG. 4 is a greatly enlarged sectional side view of the upper platen, taken along the section line 4—4 of FIG. 1.

The upper platen 20 is drivingly coupled to the drive shaft 42 via toggle link mechanism, generally designated 56, having a pair of upper toggle links 58, fixed to the drive shaft 42, and disposed between the bearing blocks 44. The links 58 include lower ends 59 pivotally coupled to the upper ends 60 of lower toggle links 61 via pivot pins 62. The bottom ends 63 of toggle links 61 are pivotally coupled to the upper platen 20 via pivot pins 65 which are coupled to vertically disposed pins 64 having a threaded lower sections 66 which are threadedly received in nuts 68 journaled for rotation in journal boxes 67 provided on platen 20 (FIG. 4). A collar 70 is provided for vertically retaining each nut 68 in the journal box 67.

The vertical position of platen 20 relative to the frame 12 can be vertically adjusted via a chain or belt 72 which is trained around two sprocket wheels 74 fixed to the nuts 68 on each of the threaded screws 60. The chain 72 is also trained around two additional sprocket wheels 77 journaled atop the upper platen 20. A platen supported motor 76 includes an output shaft 78 coupled to one of the sprocket wheels 77 for driving the chain or belt 72 which rotates the nuts 69 that travel along the screw threads 60 to raise and lower the upper platen 20 relative to the lower platen 22 and thus control the shut height therebetween.

A pair of a double acting, pneumatically operated assist cylinders 80 are mounted to a plate 82, fixed to the underside of header 16. The cylinders 80 include piston rods 84, to assist in moving the upper trim die assembly 19 vertically between the spaced apart positions, illustrated in FIG. 5, and the closed positions, illustrated in FIG. 6. A stabilizer bar 86 spans the threaded screws 60 so the threaded screws 66 do not rotate about their vertical axes.

The upper trim die assembly 19 includes an upper trim die, generally designated 90, mounted on the underside of the upper platen 20. The upper trim die 90 includes a plurality of upper annular trim die knives, 92, each having an annular knife edge 94 for engaging the upper side 93 of the sheet along the circumferential border b (FIG. 8A) of article A provided in the sheet 11. The upper annular trim die knife 92 include cylindrical passages 95, therethrough, having axes 97, which receive the article A when the upper and lower trim die assemblies are in the closed and trim positions illustrated in FIGS. 7 and 8.

Figure 8:
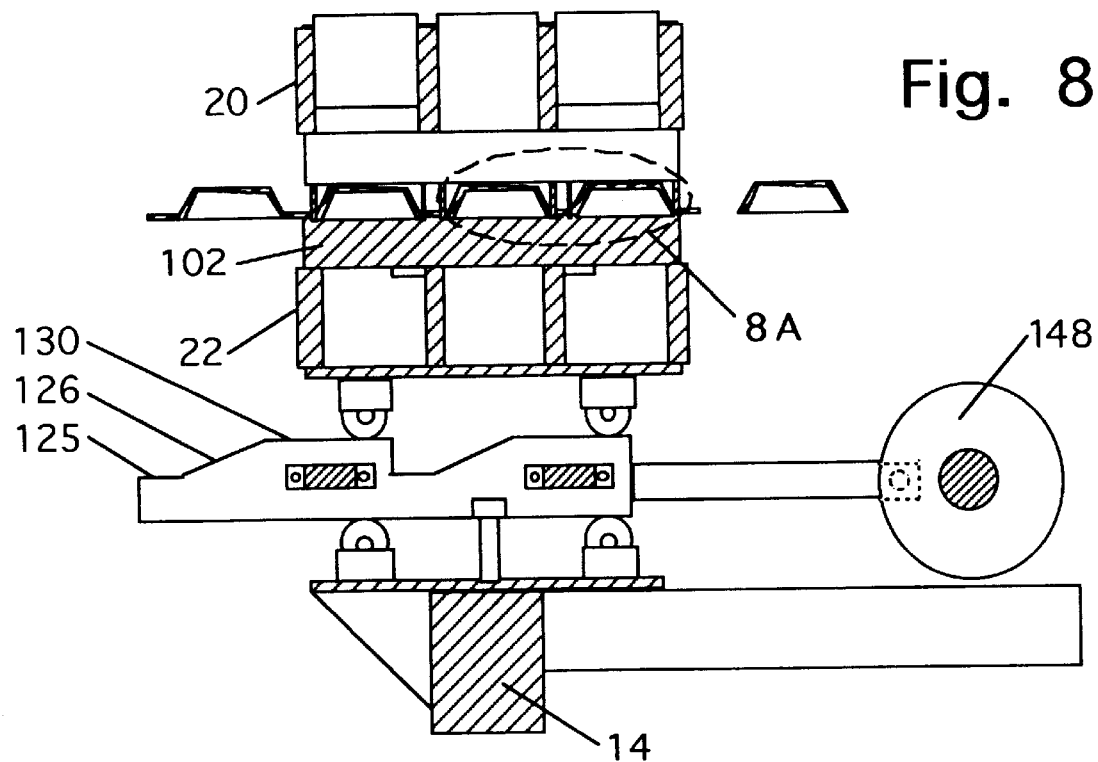
FIG. 8 is a reduced, side elevational view similar to FIGS. 5–7 illustrating the trim dies in further adjusted, sheet severing positions.
Figure 8A:
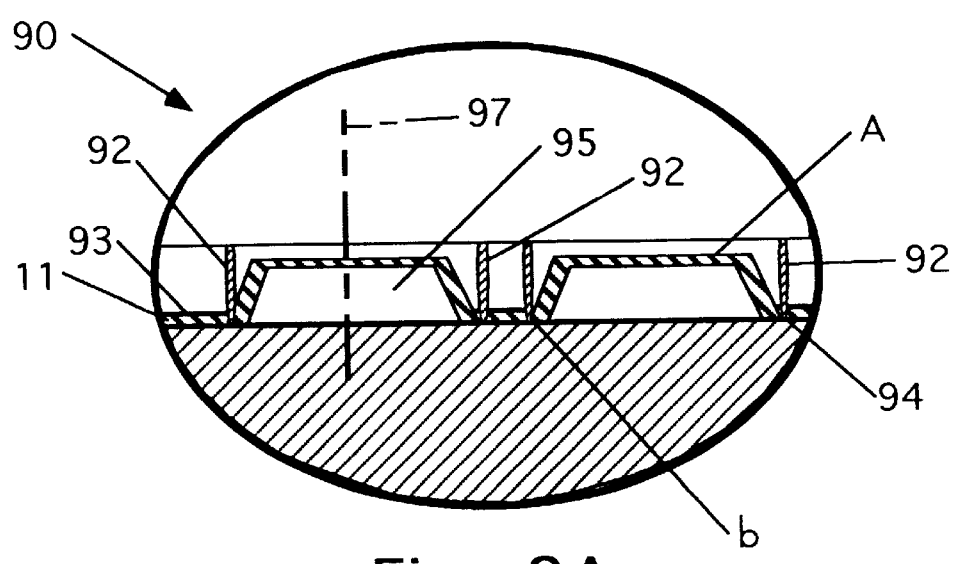
FIG. 8A is a greatly enlarged sectional side view more particularly illustrating the trim die portions encircled in the chain line circle 8A of FIG. 8.
Figure 9:
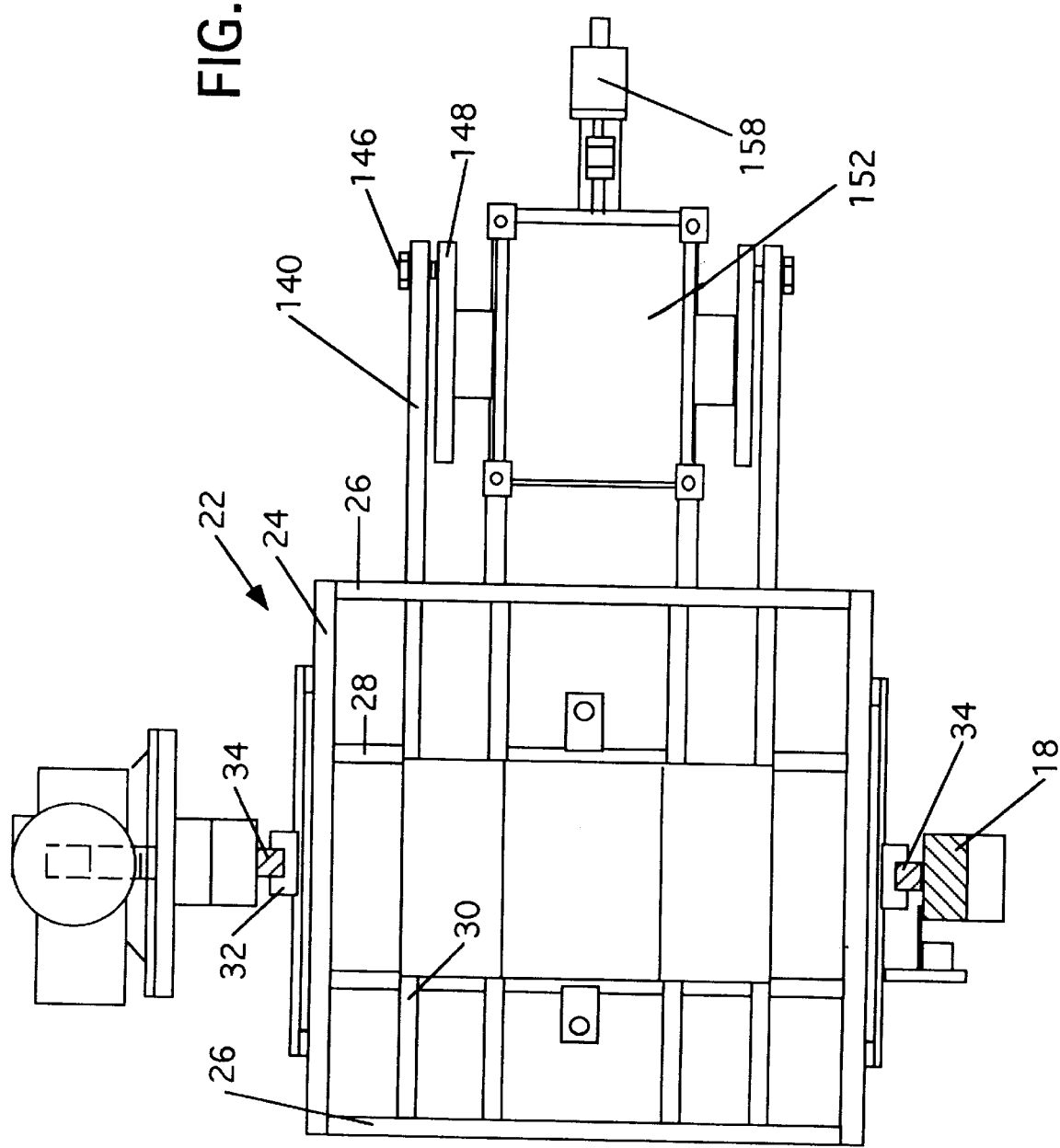
FIG. 9 is a top plan view of the bottom platen taken along the section line 9—9 of FIG. 1.

Mounted on the lower platen 22 is a cooperating tool comprising a trim die anvil 102, against which the annular upper knife edges 94 bear after passing through the sheet 11 to the position illustrated in FIGS. 8 and 8A. The secondary, lower trim die anvil 102 is mounted on the upper face of the lower base 14 via suitable mounting brackets.

The Motor Driven Crank Assembly

Figure 2:
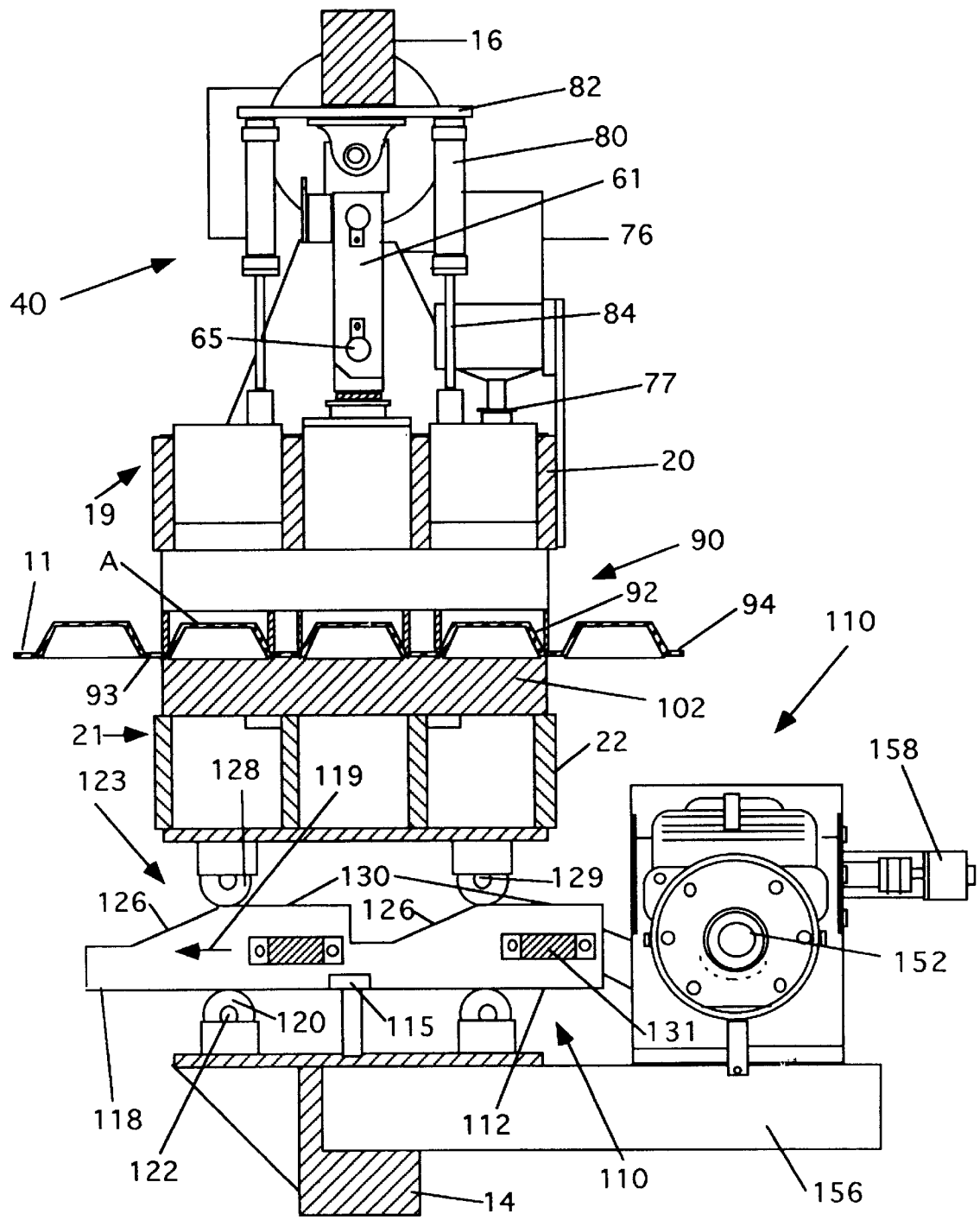
FIG. 2 is an enlarged sectional side view, taken along the section line 2—2 of FIG. 1.
Figure 3:
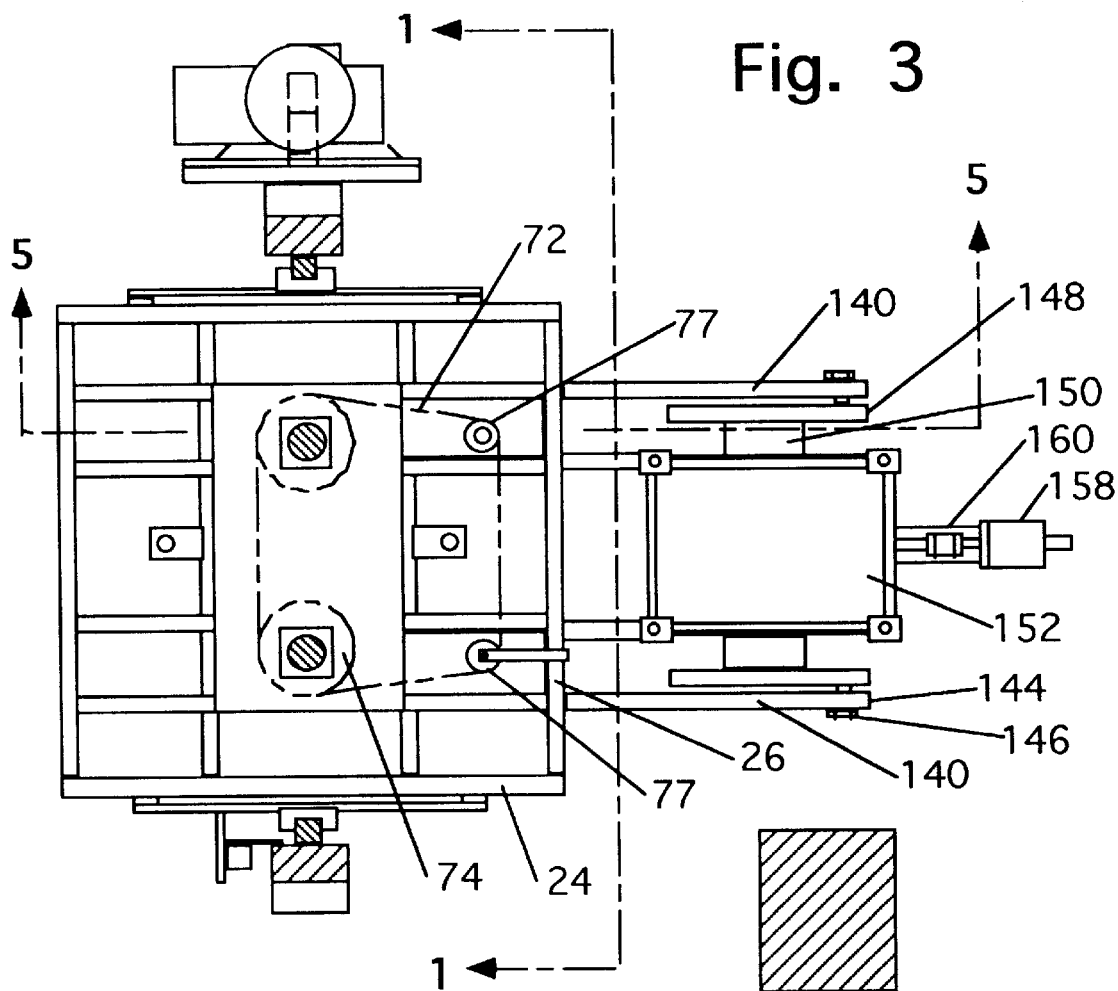
FIG. 3 is a slightly reduced, top plan sectional view of the machine taken along the section line 3—3 of FIG. 1.
Figure 5:
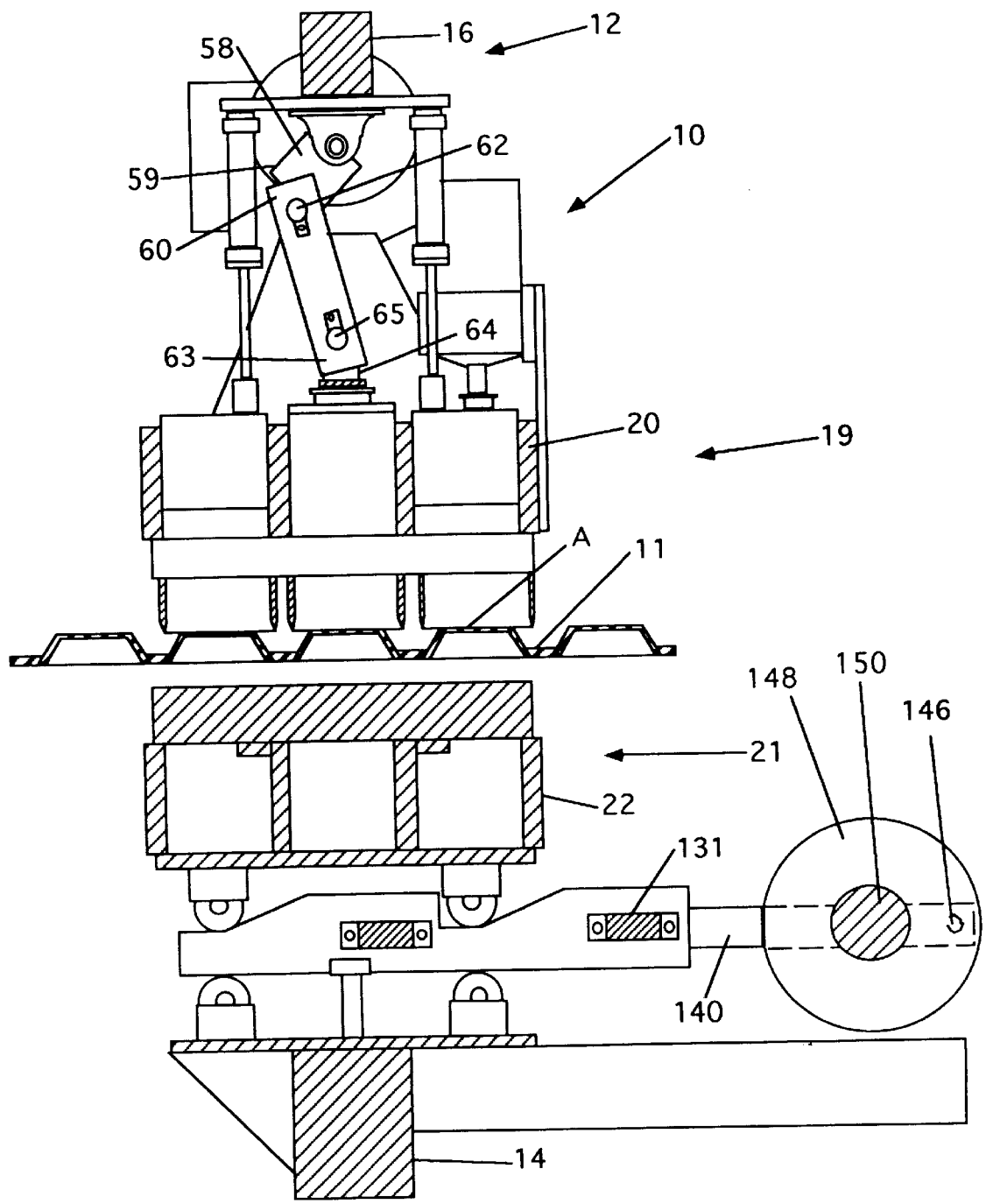
FIG. 5 is a greatly enlarged side sectional view, taken along the section line 5—5 of FIG. 3, illustrating the relative positions of the wedge, crank and trim dies in a starting position.

A motor driven crank assembly, generally designated 110, is provided for moving the lower trim die assembly 21, including the lower platen 22 and trim die anvil 102 mounted thereon, between the removed spaced apart positions, illustrated in FIG. 5, and the closed positions, illustrated in FIGS. 1, and 2, and thence to sheet severing positions illustrated in FIGS. 8 and 8A. The crank assembly 110 includes a pair of horizontally disposed wedge members 112 mounted on the frame 12 below the lower trim platen 22 for transverse horizontal movement, in the direction of the arrows 119 between the various different positions, illustrated in FIGS. 5, 6, 7 and 8. The wedge members 112 have bottom horizontal surfaces 118 which ride along frame supported rollers 120 journaled on the frame F via pivot pins 122. Side guides 115 laterally guide the wedges 112 to keep the wedges 112 from inadvertently moving sideways.

Figure 7:
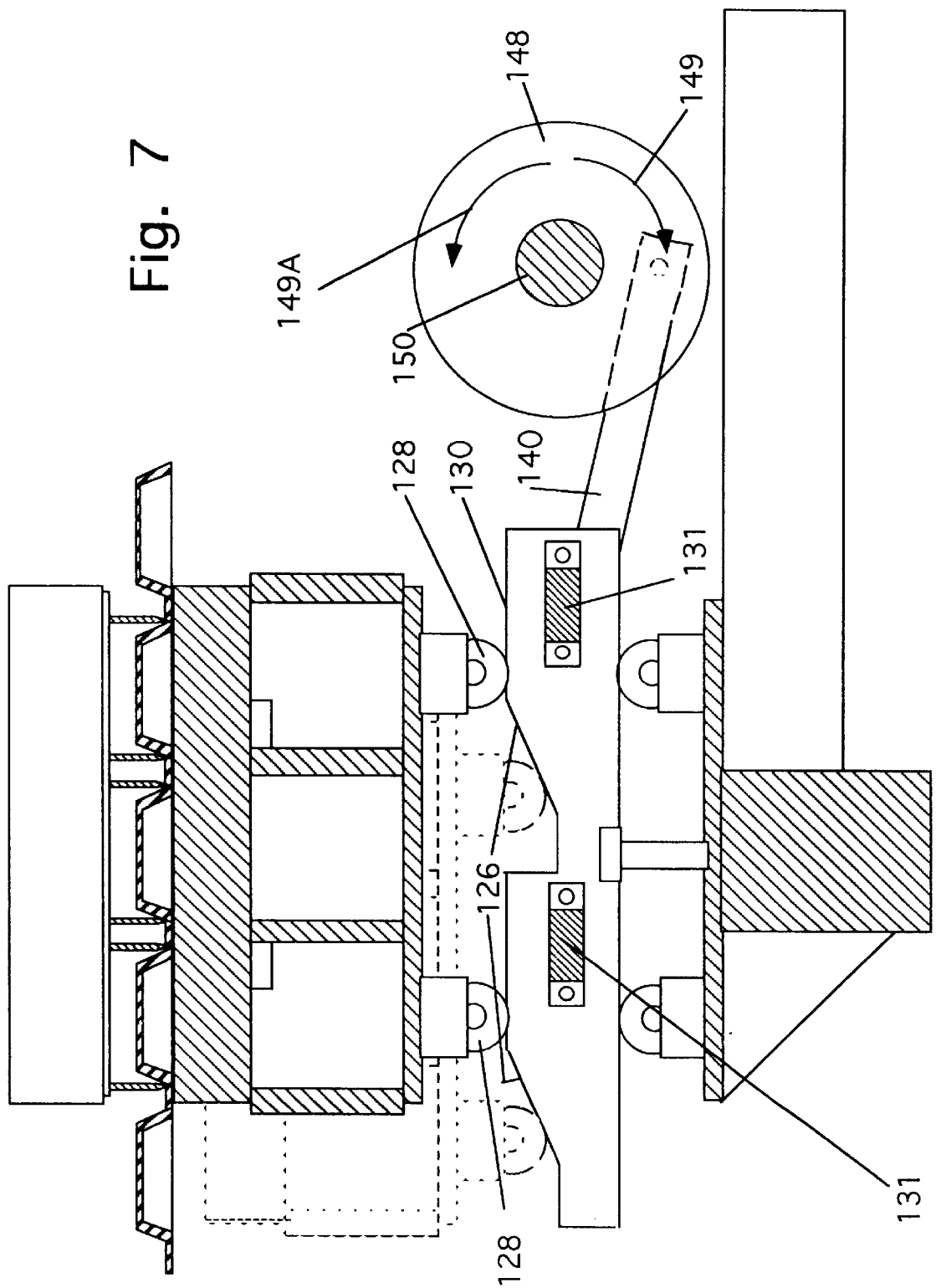
FIG. 7 is a greatly enlarged fragmentary sectional side view, similar to FIG. 6, more particularly illustrating the trim dies in closed positions clamped to a sheet of thermoplastic material having parts integrally thermoformed therein.

The upper surface 124 of each wedge 112 includes a cam surface, generally designated 123, on which a pair of cam follower rollers 128 ride. Each cam surface 123 has a pair of longitudinally aligned, generally horizontal, lower surfaces 125, a pair of longitudinally aligned, sharply inclined upstream wedging surfaces 126, and a pair of less sharply inclined trim cam surfaces 130. A pair of braces 131 span the wedges 112. The cam follower rollers 128 are journaled on pins 129 fixed to the underside of the lower platen 22. The longitudinally aligned sharply inclined upstream cam wedge surfaces 126 rapidly force the lower platen 22 and trim die anvil 102 upwardly while the upper annular die knives 102 are being downwardly from the removed non-trimming positions, illustrated in FIG. 5, to the closed positions engaging a sheet S as illustrated in FIGS. 7.

The second pair of less sharply inclined, trim cam surfaces 130 are inclined horizontally at a substantially reduced angle relative to the horizon, relative to the path of travel represented by the arrows 119 and relative to the inclination of longitudinally aligned sharply inclined upstream wedging surfaces 126. The power required to upwardly move the lower platen 22 during the sheet severing portion of the cycle, from the position illustrated in FIG. 7 to the closed position illustrated in FIG. 8, is substantially greater than the power required to move the lower platen 22 upwardly, from the position illustrated in FIG. 5 to the position illustrated in FIG. 7, while not under load.

The motor driven crank assembly 110 includes a pair of laterally spaced apart crank arms 140 pivotally coupled at their inner ends to the slides 112. The crank arms 140 include outer ends 144 eccentrically coupled to a pair of crank pins 146 mounted on the perimeter portion of a pair of crank wheels 148 coupled to opposite ends of the output shaft 150 of a gear box 152 which is supported on the frame 14 via cantileverly supported frame bars 156. The gear box 152 is driven via an electrically energized and controlled by a servo motor 158 releasably coupled to the gear box 152 via a coupling 160.

The Operation

The sheet 12, including the integral, differential pressure formed articles A is passed between the upper and lower trim die assemblies 19 and 21 in the spaced apart positions illustrated in FIG. 5. Sheet carrying chains 17 are temporarily interrupted as the motor 48 is operated to drive shaft 42 to force the upper die assembly 21 downwardly. The trim motor 158 is concurrently operated to move the wedges 112 from the lowermost, rest or lull positions, illustrated in FIG. 5 to the partially closed, intermediate positions illustrated in FIG. 6, to partially close the upper and lower trim die assemblies 19 and 21. Since relatively little power is required to raise the unloaded trim die anvil 102, the motor 158 upwardly moves the lower trim die assembly 21 along the longitudinally aligned sharply inclined upstream wedging surface 126 relatively rapidly. The motors 48 and 158 continue to move the upper and lower trim die assemblies toward each other until they reach the closed positions illustrated in FIG. 7. In the position, illustrated in FIG. 7, the follower rollers 128 will have completed their travel along the longitudinally aligned, sharply inclined upstream wedging surface 126 and will be in position to commence travel along the relatively less inclined, trim cam surface 130.

At this point, the upper trim die assembly 19 will remain stationary as the servo motor 158 continues to operate and turn the crank wheels 148 from the position illustrated in FIG. 7, to the position illustrated in FIG. 8, in the direction of the arrow 149. This will upwardly, gradually and relatively slowly, force the lower anvil 102 toward the upper annular upper trim die knife edge 94, causing the annular knives 102 to cut through the sheet 11 along the borders b of the articles A to sever the articles at the trim station from the sheet 11.

The servo motor 158 then continues operation in the same direction, represented by the arrow 149A, to retract the lower trim die assembly 21 from the position illustrated in FIG. 8 to the position illustrated in FIG. 5, while the motor 46 is reversely operated to raise the upper platen from the trim position illustrated in FIG. 8 to the position illustrated in FIG. 5. The sheet 11 is then indexed downstream to present successive articles A, differentially pressure formed in the sheet 11, to a position between the upper and lower trim die assemblies 19 and 21 so that the operation can be repeated.

Figure 6:
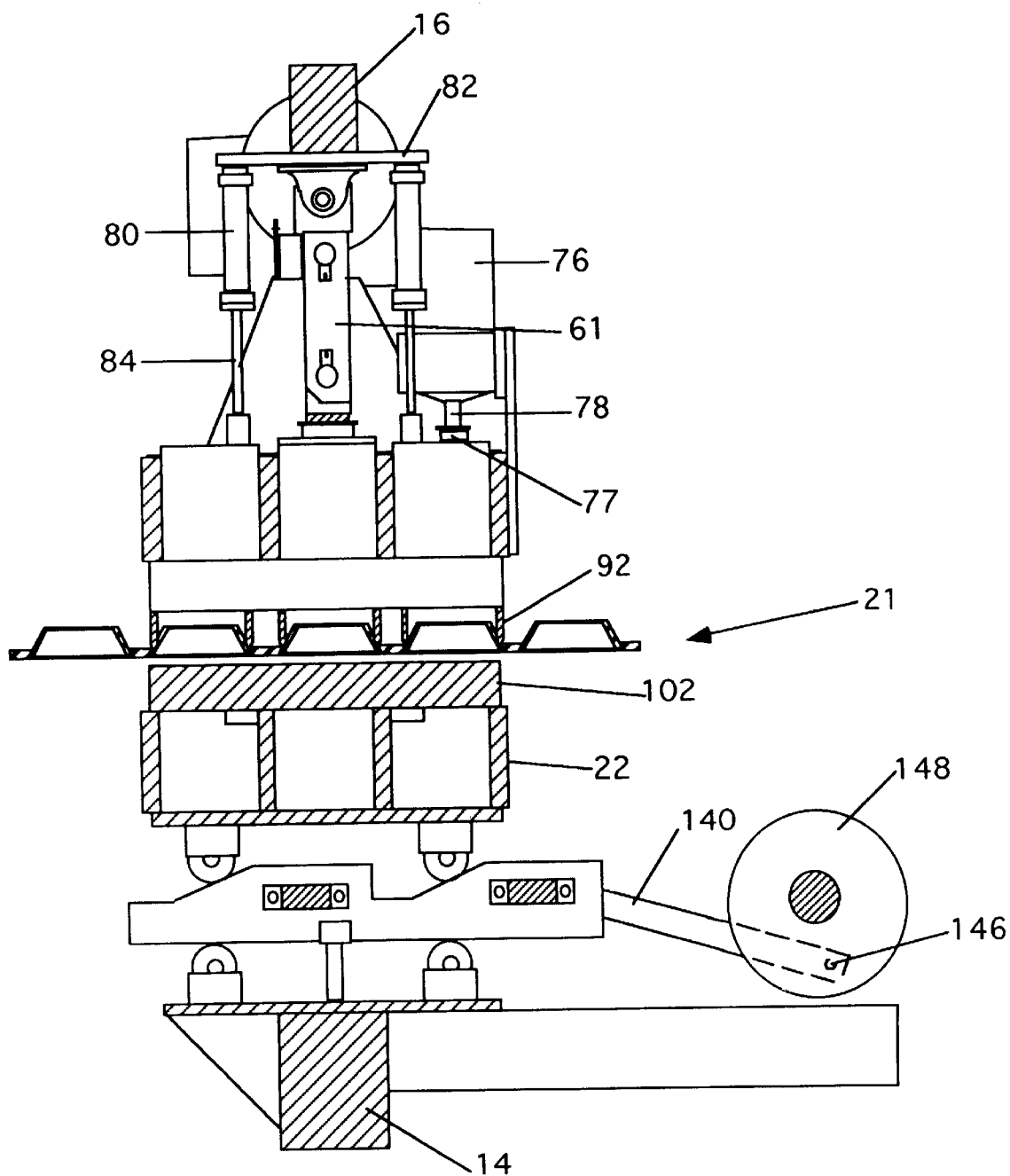
FIG. 6 is a side sectional view similar to FIG. 5 illustrating the trim dies in sequential, partially closed positions.

If the articles A are relatively shallow in depth, it may not be necessary to return the lower trim die assembly to the lowermost position illustrated in FIG. 5 but the wedges may only be returned to the positions illustrated in FIG. 6 and in chain lines in FIG. 7. This is accomplished by electronically adjusting the servo motor 158 to only partially rotate the crank wheel 148 to the partially rotated position illustrated in FIG. 6. Accordingly, the articles may be trimmed at a more rapid rate and would, otherwise, if the lower die assembly was required to travel through a full stroke to the position illustrated in FIG. 5.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. A trim machine for severing articles, integrally differentially pressure formed in a thermoplastic sheet, from the thermoplastic sheet comprising:

a frame;

upper and lower trim dies, mounted on said frame, having opposed cooperating sheet severing members;

means mounting said upper and lower trim dies for relative to-and-fro movement between vertically spaced apart positions for receiving said sheet, carrying said articles therebetween, and first closed positions clamped to opposite sides of said sheet and then to second, further closed, sheet severing positions in which said opposed cooperating sheet severing members cut through said sheet to sever an article from said sheet;

means for moving said sheet between said upper and lower trim dies in said spaced apart positions to present an article to be trimmed at said trim station;

means for successively relatively moving said upper and lower trim dies between said spaced apart positions and said first closed positions at a first predetermined rate and from said first closed positions to said second further closed sheet severing positions at a second predetermined rate substantially less than said predetermined rate including wedge means for reacting between said frame and one of said upper and lower trim dies for moving said one of said upper and lower trim dies toward the other of said upper and lower trim dies;

means mounting said wedge means for transverse linear movement in a to-and-fro transverse path transversely to the path of movement of said one of said upper and lower trim dies between a laterally outer, withdrawn position and a laterally inner wedging position;

means for moving said wedge means between said laterally outer withdrawn position and said laterally inner wedging position comprising crank drive mechanism coupled to said wedge means, and a servomotor coupled to said crank drive mechanism for driving said crank drive mechanism and said wedge means in said to-and-fro transverse path;

said wedge means comprising a first vertically inclined ramp having a first predetermined inclination relative to said to-and-fro transverse path and a second vertically inclined ramp, laterally adjacent said first ramp, having a second predetermined inclination substantially less than said first predetermined inclination.

2. The trim machine set forth in claim 1 wherein said wedge means comprises a one piece, two-part ramp including a laterally inward ramp section having said first predetermined inclination relative to said transverse path and a laterally outer ramp section, having said second predetermined inclination relative to said transverse path, abutting said laterally inward ramp section.

3. The trim machine set forth in claim 2 including follower means on said one trim die for guiding along said two-part ramp for movement along said laterally inner and outer ramp sections;

said follower means comprising roller means mounted on said one trim die; and further including additional roller means on said frame on which said wedge means rolls between said laterally inner and outer positions.

4. The trim machine set forth in claim 1 wherein said crank drive mechanism comprises a crank drive arm having a first end coupled to said wedge means and a second end;

a drive wheel rotatably mounted on said frame for rotation about an axis;

means eccentrically coupling said second end of said crank drive arm to said drive wheel;

means drivingly coupling said servomotor to said drive wheel; and means for selectively reversing the direction of rotation of said servomotor at selected intervals to drive said crank arm at any selected one of a plurality of different strokes to vary the stroke of travel of said one trim die to any selected one of a plurality of different strokes.

5. Trim apparatus for severing articles which have been differentially pressure formed in a thermoplastic sheet from the thermoplastic sheet comprising:

a frame;

means on said frame for supporting a thermoplastic sheet, having articles differentially pressure formed therein, at a trim station;

a pair of trim platens, each mounting a trim die, mounted on said frame for movement between spaced apart positions, removed from said sheet and first closed positions in which said trim dies engage opposite sides of said sheet, and second further closed sheet severing positions in which at least one of said trim dies penetrates said sheet to sever an article at said trim station from said sheet;

means for successively moving said trim platens between said spaced apart positions spaced from said sheet and said first closed positions and said second further closed position comprising first wedge means, having a first predetermined inclination, for reacting between said frame and at least one of said platens for moving said one platen and one of said trim dies mounted thereon at a predetermined rate toward the other trim die from said spaced apart position to said first closed position;

second wedge means laterally contiguous with said first wedge means and, having a second lessor inclination substantially less than said first inclination, for reacting between said frame and said one trim platen for incrementally moving said one trim platen and said one trim die at a second lesser rate, substantially less than said predetermined rate, from said first closed position to said second closed sheet severing position to sever said article from said sheet at said trim station;

means mounting said first and second wedge means for linear transverse movement in a path of movement transverse to the path of movement of said one trim platen to successively present said first and second wedge means between remote non-wedging positions and wedging positions reacting between said frame and said one trim platen; and motor driven crank means for transversely moving said first wedge means between said non-wedging position and said wedging position to move said one trim platen to said first closed position and for the successively moving said second wedge means between said non-wedging position and said wedging position to incrementally move said one trim platen and said one trim die, from said first closed position to said second closed sheet severing position.

6. The trim apparatus set forth in claim 5 wherein said first wedge means comprises a first inclined wedge surface having said first predetermined inclination, said second wedge means comprises a second wedge surface which is a continuation of said first surface but has said second lesser inclination less than said first predetermined inclination.

7. The trim apparatus set forth in claim 5 wherein said means mounting said first and second wedge means for transverse movement comprises a transversely moveable slide mounted for movement between laterally inner and laterally outer positions; said motor driven crank means comprises a crank arm having one end coupled to said slide and an opposite end;

a crank wheel rotatable about an axis;

means eccentrically coupling said opposite end of said crank arm to said crank wheel; and a servomotor drivingly coupled to said crank wheel.

8. The trim apparatus set forth in claim 5 wherein said first and second wedge means comprise first and second, laterally adjacent inclined ramps for relatively rapidly and slowly, respectively, moving said one trim platen; said means for supporting said thermoplastic sheet comprising means for successively indexing a continuous thermoplastic sheet downstream to said trim station; said motor driven crank means comprising a crank rotatable about a predetermined axis; servomotor means for selectively driving said crank in opposite directions; and means for selectively varying the degree of rotation of said crank in either rotary direction to adjust the movement of said first inclined ramp and selectively vary the length stroke of rapid travel of said one trim die.

9. Trim apparatus for severing articles which have been differentially pressure formed in a thermoplastic sheet from the thermoplastic sheet comprising:

a frame;

means on said frame for supporting a thermoplastic sheet, having articles differentially pressure formed therein, at a trim station;

a pair of trim platens, each mounting a trim die, mounted on said frame for movement between spaced apart positions, removed from said sheet and first closed positions in which said trim dies engage opposite sides of said sheet, and second further closed, sheet severing positions in which at least one of said trim dies penetrates said sheet to sever an article at said trim station from said sheet;

means for successively moving said trim platens between said spaced apart positions and said first and second closed positions comprising wedge mechanism for reacting between said frame and at least one of said trim platens; and means mounting said wedge mechanism for linear transverse movement in a path transverse to the path of movement of said trim platens between a laterally remote position, a first wedging position and successively to a second wedging position;

said wedge mechanism including a first wedge section, having a first inclination, for moving said one trim platen, and one of said trim dies mounted thereon, toward the other trim platen from said spaced apart position to said first closed position when said wedge mechanism is in said first wedging position, and a second wedge section, continuing from said first wedge section but having a second inclination different than said first inclination, for moving said one platen, and said one trim die thereon, from said first closed position to said second closed, sheet severing position when said wedge mechanism is in said second wedging position; and motor driven crank means for moving said wedge mechanism linearly transversely to successively move said wedge mechanism from said remote position to said first wedging position and then to said second wedging position.

10. The trim apparatus set forth in claim 9 wherein said motor driven crank means comprises a crank arm having one end coupled to said wedge and an opposite end;

a crank wheel mounted on said frame for rotation about an axis;

means eccentrically coupling said opposite end of said crank arm to said crank wheel; and a servomotor drivingly coupled to said crank wheel for rotating said wheel to drive said crank arm and said slide in a to-and-fro transverse path of travel.

11. The trim apparatus set forth in claim 9 wherein said first wedge section moves said one platen toward said other platen at a predetermined rate; said second wedge section moving said one platen toward said other platen at a lesser predetermined rate.

12. The trim apparatus set forth in claim 9 wherein said first wedge means has a first predetermined inclination relative to the path of movement of said one trim platen and said second wedge means has a greater predetermined inclination relative to said path of movement; said motor driven crank means includes
 a crank rotatable about an axis in either direction of rotation;
 a servomotor drivingly coupled to said crank for selectively rotating said crank in opposite directions; and
 means for selectively varying the degree of rotation of said crank in either of said directions of rotation to selectively adjust and control the stroke of movement of said one trim die in any selected one of a plurality of different strokes.

13. Trim apparatus for severing articles which have been differentially pressure formed in a thermoplastic sheet from the thermoplastic sheet comprising
 a frame;
 means on said frame for supporting a thermoplastic sheet, having articles differentially pressure formed therein, at a trim station;
 a pair of opposed cooperating trim dies mounted on said frame for movement in a first path of travel between spaced apart positions, removed from said sheet, first closed positions engaging opposite sides of said sheet, and second further closed, sheet severing positions to sever an article from said sheet at said trim station;
 means for successively moving said opposed cooperating trim dies between said spaced apart positions, said first closed positions and said second further closed, sheet severing positions comprising
  a wedge mounted on said frame for movement in a second linear path of travel transverse to said first path of travel, between a non-wedging mode, a first wedging mode, and a second wedging mode;
 said wedge including
  first wedge means, having a first inclination relative to said first path of travel, for moving at least one of said opposed cooperating trim dies toward the other of said opposed cooperating trim dies at a predetermined rate of travel from said spaced apart position to said first closed position when said wedge is in said first wedging mode;
  second wedge means, contiguous with said first wedge means and having a second inclination relative to said first path of travel, for moving said one opposed cooperating trim die toward said other opposed cooperating trim die at a second lesser rate of travel substantially less than said predetermined rate of travel from said first closed position to said second closed position when said wedge is in said second wedging mode and
 means for successively transversely moving said wedge from said non-wedging mode to said first wedging mode and then to said second wedging mode comprising
  a crank rotatable about an axis and including an eccentric portion eccentrically coupled to said wedge, and
  a motor rotatable about said axis and drivingly coupled to said crank.

14. The trim apparatus set forth in claim 13 wherein said means for moving said opposed cooperating trim dies includes roller means coupled to said one opposed cooperating trim die for successively engaging said first and second wedge means to displace said one trim die in a direction normal to said second path of travel.

15. The trim apparatus set forth in claim 14 wherein said first path of travel is vertical and said second path of travel is horizontal;
 said motor comprises a servomotor;
 said means for successively transversely moving said wedge comprising means for selectively driving said servomotor through any selected one of a plurality of different degrees of rotation to selectively adjust the stroke of travel of said one opposed cooperating trim die to any selected one of a plurality of different strokes of travel.

16. Trim apparatus for severing an article integrally differentially pressure formed in a thermoplastic sheet, from the sheet, at a trim station comprising:
 a frame;
 a pair of trim platens, each mounting a trim die, mounted on said frame for relative movement in a longitudinal path of travel between spaced apart open positions, less spaced apart closed positions, and further less spaced apart sheet severing positions;
 first wedge means linearly moveable between a remote position and a wedging position disposed between said frame and one of said trim platens for relatively moving at least said one trim platen toward the other of said trim platens from said open position to said closed position at a first rate of travel;
 second wedge means, laterally adjacent said first wedge means, linearly moveable between a second remote position and said wedging position between said frame and said one trim platen for relatively moving at least said one trim platen from said closed position to said sheet severing position at a second rate of travel substantially less than said first rate of travel to sever an article from said sheet at said trim station; and
 means for concurrently reciprocally moving said first and second wedge means laterally adjacent each other in a to-and-fro transverse path of travel to successively dispose said first and second wedge means in said wedging position comprising
  crank means, rotatable about an axis, having an eccentric portion eccentrically coupled to said first and second wedge means for moving said first and second wedge means in said to-and-fro transverse path of travel, and
  servomotor drive means drivingly coupled to said crank means for rotating said crank means about said axis and reciprocally move said first and second wedge means in said to-and-fro transverse path of travel;
 said first wedge means comprising a first wedge surface having a predetermined inclination relative to said transverse path of travel for moving said one trim platen at said predetermined rate of travel; said second wedge means comprising a second wedge surface having a second lesser inclination relative to said transverse path of travel, substantially less than said predetermined inclination, to successively move said one trim platen from said closed position to said sheet severing position at said second rate of travel.

17. The trim apparatus set forth in claim 16 wherein said crank means comprises a crank arm having one end coupled to said first and second wedge and a second end; means for concurrently moving said first and second wedge means including, a crank wheel rotatable about said axis, said crank wheel including an eccentric portion eccentrically coupled said second end of said crank arm; said servomotor being drivingly coupled to said crank wheel to rotate said crank wheel about said axis.

18. The trim apparatus set forth in claim 16 wherein said second wedge surface is a smooth, uninterrupted continuation of said first wedge surface.

19. The trim apparatus set forth in claim 16 wherein said means for reciprocally moving said first and second wedge means includes means for selectively driving said crank means in opposite directions through any selected one of a plurality of different degrees of rotation to adjust the stroke of movement of said first wedge means and to adjust the stroke of travel of said one trim die.

20. A method of trimming and severing an article, which has been integrally, differentially formed in a thermoplastic sheet, from the thermoplastic sheet comprising the steps of:

indexing a sheet of thermoplastic material, having an article differentially pressure formed therein, to a position disposed between a pair of spaced apart, opposed, trim dies at a trim station;

relatively moving said trim dies in a longitudinal path of travel between spaced apart positions and closed positions engaging opposite sides of said sheet;

moving at least one of said trim dies toward the other of said trim dies to relatively move said trim dies from said closed positions to sheet severing positions to sever an article from said sheet at said trim station;

said step of relatively moving said trim dies being accomplished by linearly moving first vertically inclined wedge means, having a first predetermined inclination, in a transverse path of travel transverse to said longitudinal path of travel to move said one trim die relative to said other trim die at a predetermined rate of travel;

said step of moving at least one of said trim dies toward the other of said trim dies being accomplished by sequentially linearly moving second wedge means, having a second lesser vertical inclination substantially less than said first predetermined inclination, in said transverse path of travel to move said one trim die at a substantially lesser predetermined rate of travel substantially less than said predetermined rate of travel;

said steps of moving said first and second wedge means being accomplished by converting rotary motion to linear motion.

21. The method set forth in claim 20 wherein said step of converting rotary motion to linear motion is accomplished by rotating a crank in a to-and-fro rotational path of travel.

22. The method set forth in claim 20 wherein said step of converting rotary motion to linear motion is accomplished by selectively transversing selected portions of said first wedge means to selectively vary the stroke of travel of said one trim die.

* * * * *